(12) United States Patent
Shih et al.

(10) Patent No.: US 10,152,181 B2
(45) Date of Patent: Dec. 11, 2018

(54) TOUCH DISPLAY DEVICE AND DRIVING METHOD THEREOF

(71) Applicant: FocalTech Systems, Co. Ltd., Hsinchu (TW)

(72) Inventors: Po-Sheng Shih, Hsinchu (TW); Chien-Yung Cheng, Hsinchu (TW)

(73) Assignee: FOCALTECH SYSTEMS, CO. LTD., Hsinchu (TW)

( * ) Notice: Subject to any disclaimer, the term of this patent is extended or adjusted under 35 U.S.C. 154(b) by 71 days.

(21) Appl. No.: 15/074,730

(22) Filed: Mar. 18, 2016

(65) Prior Publication Data

US 2017/0115768 A1    Apr. 27, 2017

Related U.S. Application Data

(60) Provisional application No. 62/244,205, filed on Oct. 21, 2015.

(30) Foreign Application Priority Data

Dec. 25, 2015   (TW) .............................. 104143712 A

(51) Int. Cl.
  *G06F 3/044*   (2006.01)
  *G06F 3/041*   (2006.01)
(52) U.S. Cl.
  CPC ............ *G06F 3/044* (2013.01); *G06F 3/0412* (2013.01); *G06F 3/0416* (2013.01); *G06F 2203/04105* (2013.01); *G06F 2203/04112* (2013.01)
(58) Field of Classification Search
  CPC ................... G06F 3/0414; G06F 3/044; G06F 2203/04103; G06F 2203/04105
  USPC ........................................................ 345/174
  See application file for complete search history.

(56) References Cited

U.S. PATENT DOCUMENTS

| | | |
|---|---|---|
| 2009/0256821 A1 | 10/2009 | Mamba |
| 2009/0315858 A1 | 12/2009 | Sato |
| 2010/0182273 A1 | 7/2010 | Noguchi |
| 2010/0309162 A1* | 12/2010 | Nakanishi ............... G06F 3/044 345/174 |
| 2012/0062511 A1 | 3/2012 | Ishizaki |
| 2012/0218199 A1 | 8/2012 | Kim |
| 2014/0247239 A1* | 9/2014 | Jamshidi-Roudbari ..................... G06F 3/0414 345/174 |

(Continued)

*Primary Examiner* — Yuzhen Shen
(74) *Attorney, Agent, or Firm* — Muncy, Geissler, Olds & Lowe, P.C.

(57) ABSTRACT

A touch display device including a first substrate, a second substrate, a display medium layer, a plurality of pixel electrodes, a plurality of driving electrodes, a plurality of touch sensing electrodes, and a plurality of force-sensing electrodes is provided. The second substrate is opposite to the first substrate. The display medium layer is disposed between the first substrate and the second substrate. The pixel electrodes are disposed on the first substrate. The driving electrodes are disposed on the first substrate and overlap over the pixel electrodes. The touch sensing electrodes are disposed on one of the first substrate and the second substrate. The force-sensing electrodes are disposed on the second substrate, wherein an arrangement direction of the force-sensing electrodes is parallel to an arrangement direction of the touch sensing electrodes. A driving method of the touch display device is also provided.

15 Claims, 9 Drawing Sheets

(56) References Cited

U.S. PATENT DOCUMENTS

| | | | |
|---|---|---|---|
| 2015/0145821 A1* | 5/2015 | Kim | G06F 3/0412 345/174 |
| 2015/0153942 A1* | 6/2015 | Kim | G06F 3/04847 715/846 |
| 2015/0177884 A1* | 6/2015 | Han | G06F 3/044 345/174 |
| 2015/0370396 A1* | 12/2015 | Hotelling | G06F 3/0414 345/174 |
| 2016/0026315 A1* | 1/2016 | Choi | G06F 3/0414 345/174 |
| 2016/0034092 A1* | 2/2016 | Schmitt | G06F 3/0416 345/174 |
| 2016/0188039 A1* | 6/2016 | Yoon | G06F 3/044 345/174 |
| 2017/0031509 A1* | 2/2017 | Yoon | G06F 3/044 |
| 2017/0060340 A1* | 3/2017 | Chen | G06F 3/0412 |
| 2017/0068368 A1* | 3/2017 | Hsiao | G06F 3/0416 |
| 2017/0235414 A1* | 8/2017 | Ding | G06F 3/0416 345/174 |

* cited by examiner

TOUCH DISPLAY DEVICE AND DRIVING METHOD THEREOF

CROSS-REFERENCE TO RELATED APPLICATIONS

The present application claims the benefit of the U.S. provisional application Ser. No. 62/244,205, filed on Oct. 21, 2015, and the TW patent application serial no. 104143712, filed on Dec. 25, 2015, all of which are incorporated herein by reference in their entireties.

TECHNICAL FIELD

The present invention relates to a touch display device and driving method thereof, and particularly to a touch display device capable of sensing force-touch and driving method thereof.

BACKGROUND

Touch-sensing capacity has become necessary requirement for electronic products in the up-to-date consuming market. Integrating the touch-sensing capacity with the displaying function allows these electronic products to perform desired functions when the users directly touch the display screen. Such touch display devices therefore provide the users with more visual and convenient way in manipulation. However, the rapid development of application programs and rise of the wearable touch display devices push the demand of the market to go beyond the need for the electronic devices having only the display and touch position-sensing functions. The touch-sensing capacity can be multiplex by having an extra function of sensing force-touch at the touch position to accomplish more models of manipulation.

Nowadays, most of the touch display devices have force sensors attached under the display panel to perform the force sensing function. However, this technic easily increases the thickness of the whole touch display device and the manufacturing cost, and incurs reliability issues.

SUMMARY

The present disclosure provides a touch display device to improve the abovementioned issues in thickness, manufacturing cost, and reliability aspects.

In accordance with an exemplary embodiment of the present disclosure, a touch display device comprises a first substrate, a second substrate arranged to opposite face the first substrate, a display medium layer disposed between the first substrate and the second substrate, a plurality of pixel electrodes disposed on the first substrate, a plurality of driving electrodes disposed on the first substrate and superimposed on the pixel electrodes, a plurality of touch-sensing electrodes disposed on one of the first substrate and the second substrate, and a plurality of force-sensing electrodes disposed on the second substrate and arranged in a direction parallel to the direction in which the touch-sensing electrodes are arranged.

In accordance with another exemplary embodiment of the present disclosure, a driving method of touch display device comprises the following steps/methods. Providing a touch display device including a first substrate, a second substrate, a display medium layer, a plurality of pixel electrodes, a plurality of driving electrodes, a plurality of touch-sensing electrodes, and a plurality of force-sensing electrodes, in which the second substrate opposite faces the first substrate, the display medium layer is disposed between the first substrate and the second substrate, the pixel electrodes are disposed on the first substrate, the driving electrodes are disposed on the first substrate and superimposed on the pixel electrodes, the touch-sensing electrodes are disposed on one of the first substrate and the second substrate, the force-sensing electrodes are disposed on the second substrate and arranged in a direction parallel to the direction in which the touch-sensing electrodes are arranged, and the touch display device includes a display mode, a touch-sensing mode, and a force-sensing mode; and implementing one of the display mode, the touch-sensing mode, and the force-sensing mode in a screen frame time period.

The touch display devices in accordance with various embodiments as mentioned above utilize the driving electrodes disposed on the first substrate as driving electrodes in touch-sensing mode and force-sensing mode, and the touch-sensing electrodes and the force-sensing electrodes are disposed to implement touch-sensing and force-sensing. Therefore, the touch display devices in various embodiments not only sense the touch positions but also the force-touch so as to implement various operations of touch-sensing. In addition, disposing at least part of the sensing electrodes including the touch-sensing electrodes and/or the force-sensing electrodes inside the touch display devices not only raises the reliability of the entire device but also effectively reduces the thickness and manufacturing cost of the touch display device.

Various other objects, advantages and features of the present invention will become readily apparent from the ensuing detailed description, and the novel features will be particularly pointed out in the appended claims.

BRIEF DESCRIPTION OF DRAWINGS

The following detailed descriptions, given by way of example, and not intended to limit the present invention solely thereto, will be best be understood in conjunction with the accompanying figures.

DETAILED DESCRIPTION OF THE EMBODIMENTS

Figure 1A:
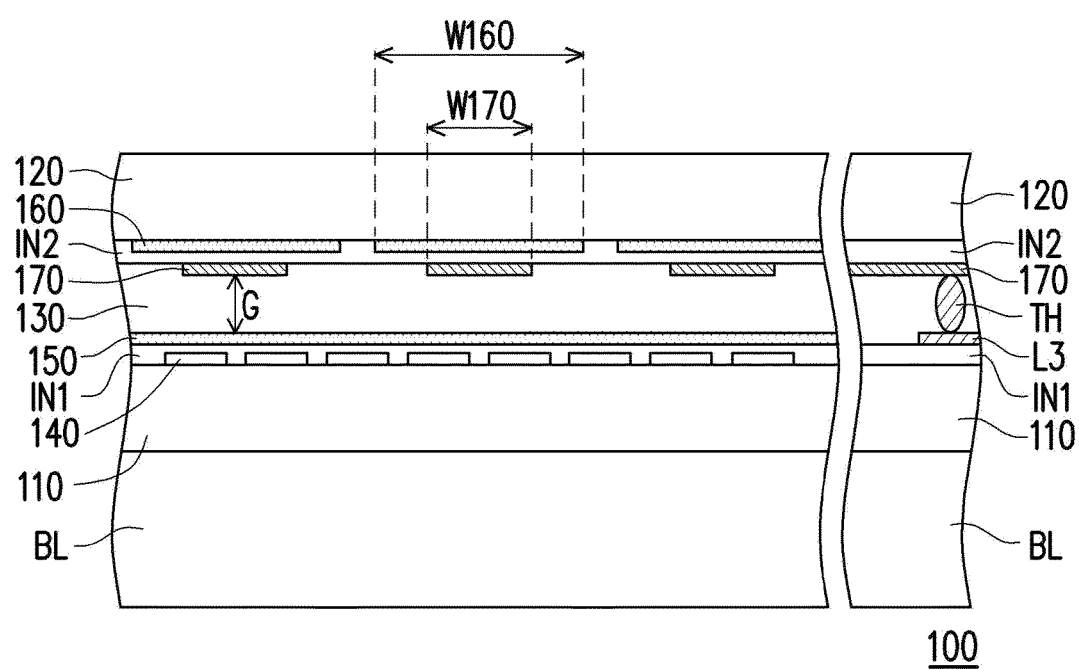
FIG. 1A is a cross-sectional view of the touch display device in accordance with a first exemplary embodiment of the claimed invention.

FIG. 1A to FIG. 1D respectively illustrate a touch display device and the driving electrodes, the force-sensing electrodes, and the touch-sensing electrodes of the touch display device in accordance with a first exemplary embodiment of the claimed invention. Referring to FIG. 1A to FIG. 1D, the touch display device 100 includes a first substrate 110, a second substrate 120, a display medium layer 130, a plurality of pixel electrodes 140, a plurality of driving electrodes 150, a plurality of touch-sensing electrodes 160, and a plurality of force-sensing electrodes 170. The second substrate 120 and the first substrate 110 are arranged in an opposite face-to-face manner.

Specifically, the display medium layer 130 is disposed between the first substrate 110 and the second substrate 120. The pixel electrodes 140 are disposed on the first substrate 110. The driving electrodes 150 are disposed on the first substrate 110 and overlap over the pixel electrodes 140. The touch-sensing electrodes 160 are disposed on one of the first substrate 110 and the second substrate 120. The force-sensing electrodes 170 are disposed on the second substrate 120. The force-sensing electrodes 170 are arranged in a direction parallel to the direction in which the touch-sensing electrodes 160 are arranged.

Either of the first substrate 110 and the second substrate 120 may be made of, but not limited to, glass, plastic, or composite material. The distance between the first substrate 110 and the second substrate 120 may be changed due to the press of a user on the touch display device 100, and thus results in change of the variable interval G between the force-sensing electrodes 170 and the driving electrodes 150. In one embodiment, a least one spacer (not shown) may be disposed between the first substrate 110 and the second substrate 120 to avoid excess compression of the distance between the first substrate 110 and the second substrate 120. In another embodiment, a plurality of kinds of spacers with different heights (not shown) may be disposed between the first substrate 110 and the second substrate 120 such that one kind of the spacers supports against the first substrate 110 and the second substrate 120 while the other kind of the spacers supports against only one of the first substrate 110 and the second substrate 120, and thereby allows change of the distance between the first substrate 110 and the second substrate 120 when the touch display device 100 is applied with an external force.

In one embodiment, the display medium layer 130 may be made of non-solid materials such as liquid crystal materials, electrophoretic materials, electro-wetting materials or the combination thereof. Therefore, the variable interval G may be changed by pressing the touch display device 100. In another embodiment, the display medium layer 130 may be made of solid materials such as organic light-emitting material or semiconductor material. Furthermore, there may be a space existing between the display medium layer 130 and the first substrate 110 to allow change of the variable interval G when a user press the touch display device 100. In another embodiment, the touch display device 100 may include a backlight module BL to provide light sources required for display. In this way, the first substrate 110 may be disposed between the second substrate 120 and the backlight module BL. Alternatively, the backlight module BL may be saved when the display medium layer 130 is made of self-luminous material.

The pixel electrodes 140 and the driving electrodes 150 may be formed on the first substrate 110 in sequences such that the pixel electrodes 140 are disposed between the driving electrode 150 and the first substrate. The touch display device 100 may further include an insulating layer IN1. The insulating layer IN1 may be disposed between the pixel electrodes 140 and the driving electrode 150 to electrically isolate the pixel electrodes 140 from the driving electrodes 150. In another embodiment, the pixel electrodes 140 and the driving electrodes 150 may be formed on the first substrate 110 in reverse sequences such that the driving electrodes 150 are disposed between the pixel electrodes 140 and the first substrate 110.

The pixel electrodes 140 and the driving electrodes 150 may be used together to form an electric field for driving the display medium layer 130 and therefore to accomplish display function. Specifically, a display mode of the touch display device 100 may be performed when a display driving waveform is supplied to the pixel electrodes 140, and a common voltage is supplied to the driving electrodes 150. The force-sensing electrodes 170 may influence the electric field for driving the display medium layer 130 since they are disposed near the display medium layer 130. To avoid this influence in the display mode, the force-sensing electrodes 170 may be supplied with a fixed voltage. The fixed voltage may be, but not limited to a common voltage or a ground signal.

The driving electrodes 150 may also be used as driving electrodes in the touch-sensing and force-sensing modes besides as the common electrodes in the display mode. In one embodiment, the size of each of the driving electrodes 150 may be larger than the size of each of the pixel electrodes 140 such that the driving electrodes 150 covers a plurality of pixel electrodes 140 and each of the driving electrodes 150 overlaps a plurality of pixel electrodes 140.

The pixel electrodes 140 and the driving electrodes 150 may be made of electrically conductive materials with high or enough light transparency. The electrically conductive materials with high light transparency may include but not limited to metal oxides such as indium tin oxide, indium oxide, or tin oxide. The electrically conductive materials with enough light transparency may include but not limited to metal mesh layers such as nano-silver wires.

Figure 3A:
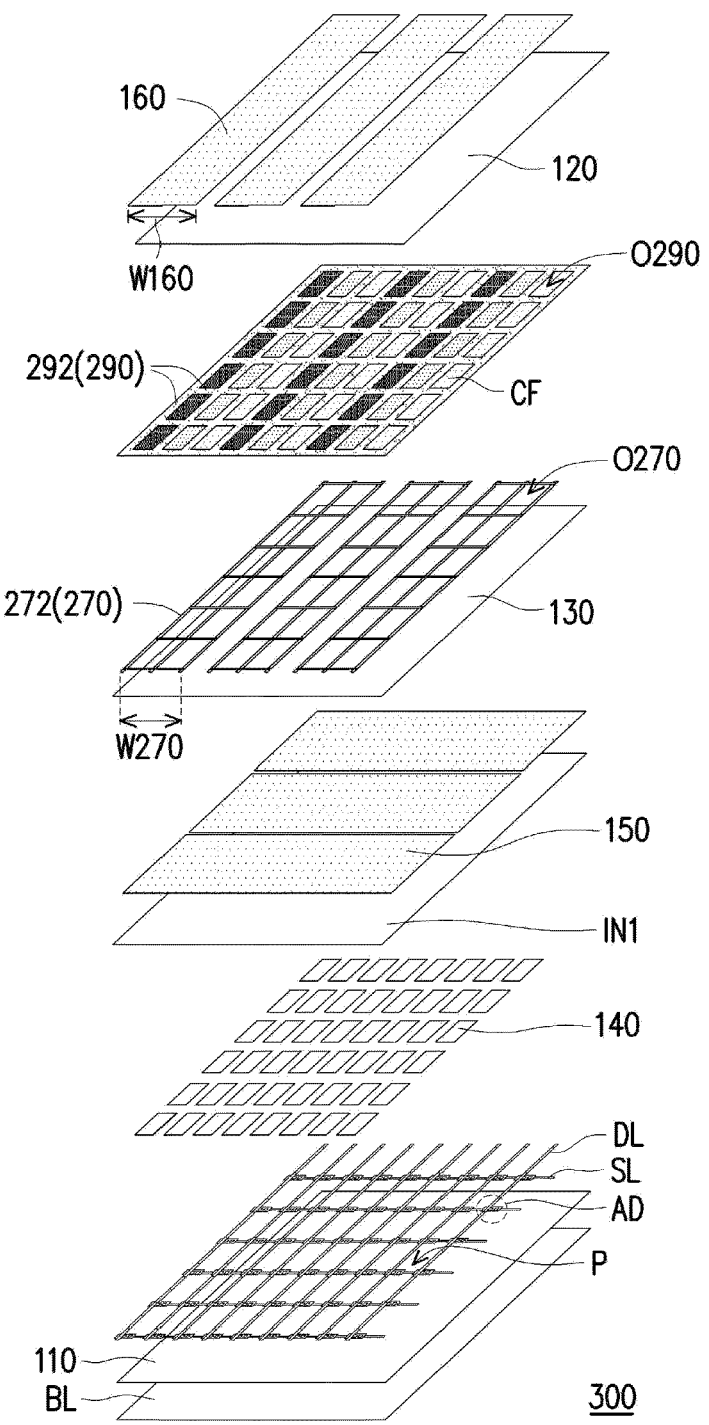
FIG. 3A is an exploded view schematically illustrating the touch display device in accordance with a third exemplary embodiment of the claimed invention.

The touch-sensing electrodes 160 and the force-sensing electrodes 170 may be formed on the second substrate 120 in sequences. In one embodiment, the touch-sensing electrodes 160 and the force-sensing electrodes 170 are disposed between the second substrate 120 and the display medium layer 130, and the force-sensing electrodes 170 are disposed between the touch-sensing electrodes 160 and the driving electrodes 150. The touch display device 100 may further include an insulating layer IN2. The insulating layer IN2 may be disposed between the touch-sensing electrodes 160 and the force-sensing electrodes 170 to electrically isolate the touch-sensing electrodes 160 from the force-sensing electrodes 170. In another embodiment, the touch-sensing electrodes 160 and the force-sensing electrodes 170 may be disposed on two opposite surfaces of the second substrate 120, respectively. For an example, the touch-sensing electrodes 160 may be disposed on an outer surface of the second substrate 120, i.e. the surface distant from the display medium layer 130, while the force-sensing electrodes 170 may be disposed on an inner surface of the second substrate 120. i.e. the surface adjacent to the display medium layer 130, as shown in FIG. 3A. In this case, the insulating layer IN2 may be saved.

The driving electrodes 150 and the touch-sensing electrodes 160 are arranged in a cross manner, and the driving electrodes 150 and the force-sensing electrodes 170 are arranged in a cross manner. For example, the driving electrodes 150 may be disposed along a first direction D1 while each of the driving electrodes 150 extends along a second direction D2 different from the first direction D1. The force-sensing electrodes 170 may be disposed along the second direction D2 while each of the force-sensing electrodes 170 extends along the first direction D1. The touch-sensing electrodes 160 may be disposed along the second direction D2 while each of the touch-sensing electrodes 160 extends along the first direction D1. The first direction D1 and the second direction D2 are crossed and may be perpendicular to each other in one embodiment.

The touch-sensing electrodes 160 and the force-sensing electrodes 170 may be made of electrically conductive materials with high or enough light transparency. The electrically conductive materials with high light transparency may include but not limited to metal oxides such as indium tin oxide, indium oxide, or tin oxide. The electrically conductive materials with enough light transparency may include but not limited to metal mesh layers such as nano-silver wires.

The driving electrodes 150 and the touch-sensing electrodes 160 may be used together in a touch-sensing mode of the touch display device 100. In the touch-sensing mode, the driving electrodes 150 may be supplied with touch driving waveforms and read the touch-sensing signals from each of the touch-sensing electrodes 160. When a user finger or a touch medium such as a touch pen press the touch screen of the touch display device 100, the electric field between the driving electrodes 150 and the touch-sensing electrodes 160 changes and produces a corresponding touch-sensing signal. In this way, the touch position of the touch medium can be obtained by detecting the position where the touch-sensing signals change.

In manipulation of the touch-sensing mode, the pixel electrodes 140 may be floating and the force-sensing electrodes 170 may be supplied with a fixed voltage. Therefore, the state of the display medium layer 130 would not be easily changed in the manipulation of the touch-sensing mode, and which helps to keep the display quality normal. The fixed voltage may be a common voltage or a ground signal. In another embodiment, the force-sensing electrode 170 may be floating.

The driving electrodes 150 and the force-sensing electrodes 170 may be used together in a force-sensing mode of the touch display device 100. In the force-sensing mode, the driving electrodes 150 may be supplied with touch driving waveforms and read the force-sensing signals from each of the force-sensing electrodes 170. When a user press the touch display device 100, the capacitance change between the force-sensing electrodes 170 and the driving electrodes 150 can be used to measure the variation of the variable interval G and to calculate magnitude of the applied force.

In manipulation of the force-sensing mode, the pixel electrodes 140 may be floating. In this way, the state of the display medium layer 130 would not be easily changed in the manipulation of the force-sensing mode, and which helps to keep the display quality normal. Besides, in the force-sensing mode, the touch-sensing electrodes 160 may be supplied with a fixed voltage. The fixed voltage may be a common voltage or a ground signal. Therefore, the influence of the finger capacitance on the mutual-capacitance type force detection could be shielded and the precision of the force detection can be improved. Alternatively, the touch-sensing electrodes 160 may be floating.

Referring to FIG. 1A, each of the force-sensing electrodes 170 may be covered by one of the touch-sensing electrodes 160, such as making the width W170 of each of the force-sensing electrodes 170 smaller than the width W160 of each of the touch-sensing electrodes 160, to avoid that the electric field of the touch-sensing electrodes 160 is shielded by the force-sensing electrodes 170. In this way, the fringe field effect can be used to implement touch detection in the touch display device 100. In this embodiment, although the force-sensing electrodes 170 and the touch sensing electrodes 160 are illustrated in a one-to-one manner, the amount of the force-sensing electrodes 170 is adjustable depending on the actual requirement. As an example, the amount of the force-sensing electrodes 170 may be less than the amount of the touch-sensing electrodes 160.

The driving electrodes 150 may be served as driving electrodes in the touch-sensing and force-sensing modes. The driving electrodes 150 and the touch-sensing electrodes 160 may be used together to implement the mutual-capacitance type touch-sensing, while the driving electrodes and the force-sensing electrodes 170 may be used together to implement the capacitance type force-sensing. The touch display device 100 may be used to simultaneously sense the touch position and the force-touch and therefore to implement various operations of touch-sensing.

Furthermore, disposing the sensing electrodes including the touch-sensing electrodes 160 and the force-sensing electrodes 170 inside the touch display device 100 not only improve the reliability of the entire device but also saves extra substrates and adhesive layers that may be required for disposing force-sensing layers. Therefore, the thickness and manufacturing cost of the touch display device 100 can be effectively reduced.

Figure 1B:
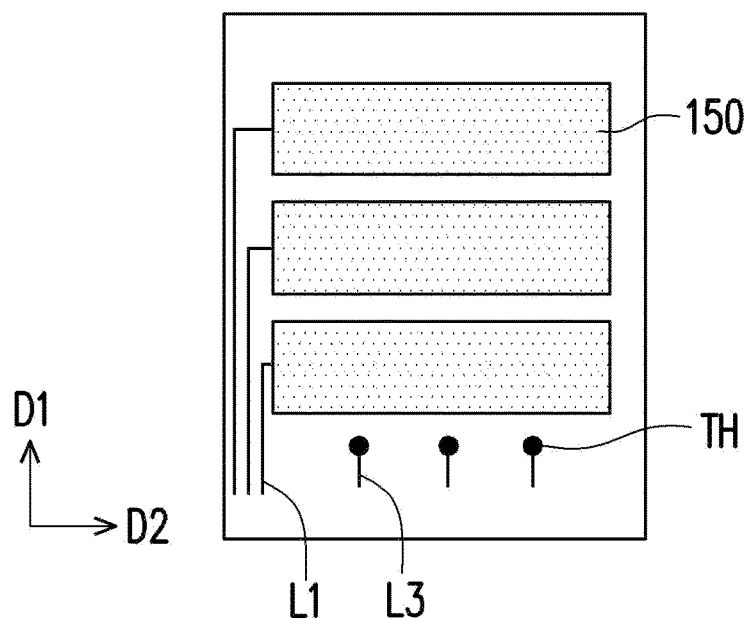
FIG. 1B to FIG. 1D are top views respectively illustrating driving electrodes, force-sensing electrodes, and touch-sensing electrodes of the FIG. 1A.
Figure 1C:
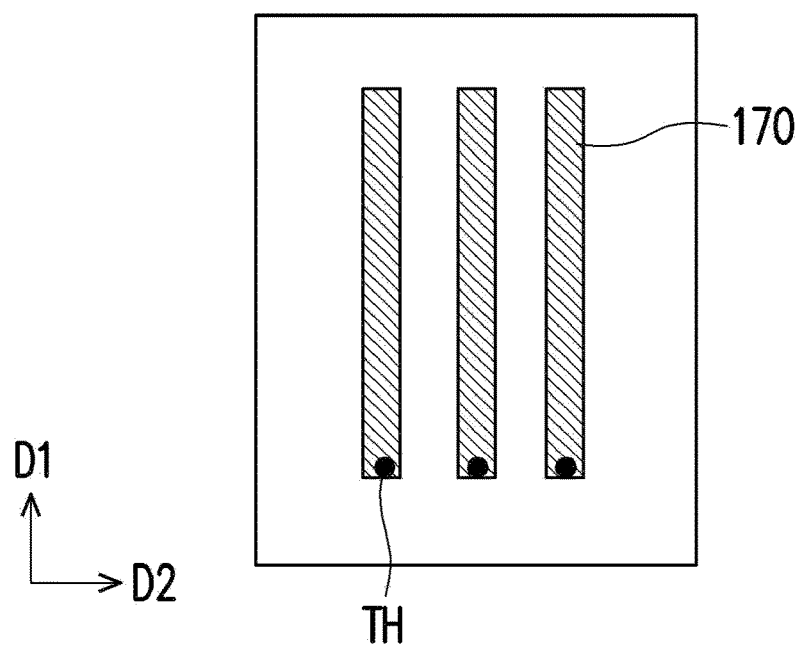
Figure 1D:
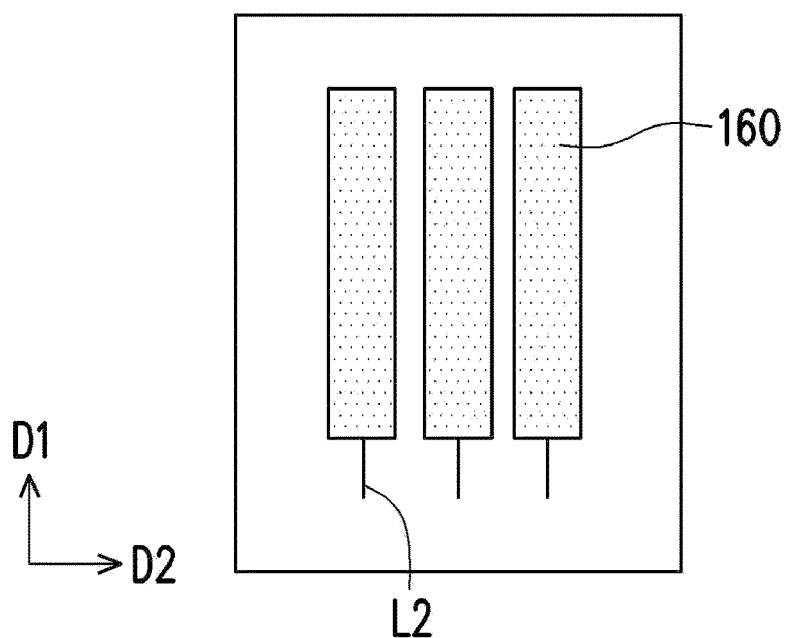

The touch display device 100 may further include other elements according to different requirements. For an example, the touch display device 100 may further include a plurality of wires to connect the abovementioned electrodes to corresponding control circuits. In one embodiment, the touch display device 100 may further include a plurality of first wires L1, a plurality of second wires L2, a plurality of third wires L3, and a plurality of conductive bumps TH. Referring to FIGS. 1B to 1D, each of the first wires L1 is connected to one of the driving electrodes 150, each of the second wires L2 is connected to one of the touch-sensing electrodes 160. The third wires L3 and the first wires L1 may be disposed on the insulating layer IN1, and each of the force-sensing electrodes 170 is correspondingly connected to one of the third wires L3 via one of the conductive bumps TH. In this way, the control circuits (not shown) for the force-sensing electrodes 170 and the control circuits (not shown) for the driving electrodes 150 can be integrated together. In other words, an integrated control circuit is used to provide driving signals in force-sensing and touch-sensing modes. The amount and the disposition of the conductive bumps TH, and the wiring layout and/or the wiring width and/or the wiring density of the first wires L1, second wires L2, and/or third wires L3 are not limited by the illustration of the FIGS. 1A to 1D. The first wires L1, second wires L2, third wires L3, conductive bumps TH may be made of, but not limited to, metal to reduce resistance, or of any electrically conductive materials.

The touch display device 100 is driven in a screen frame time period to implement one of the display mode, the touch-sensing mode, and the force-sensing mode. The screen frame time period may be one-sixtieth second. In the screen frame time period, the touch display device 100 can be manipulated to implement one or two or all of the display mode, touch-sensing mode, and force-sensing mode.

In one embodiment, the display mode, the touch-sensing mode, and the force-sensing mode may, but not limited to, be implemented separately. In this case, the force-sensing electrodes 170 may be floating or supplied with a fixed voltage when the touch display mode is manipulated in the touch-sensing mode, while the touch-sensing electrodes 160 may be floating electrodes or supplied with a fixed voltage when the touch display mode is manipulated in the force-sensing mode.

In another embodiment, the touch-sensing mode and the force-sensing mode may be implemented simultaneously in a screen frame time period, wherein the pixel electrodes 140 may be floating electrodes and the driving electrodes 150 may be supplied with touch driving waveforms and read the force-sensing signals from each of the force-sensing electrodes 170 and read the touch-sensing signals from each of the touch-sensing electrodes 160.

Figure 2A:
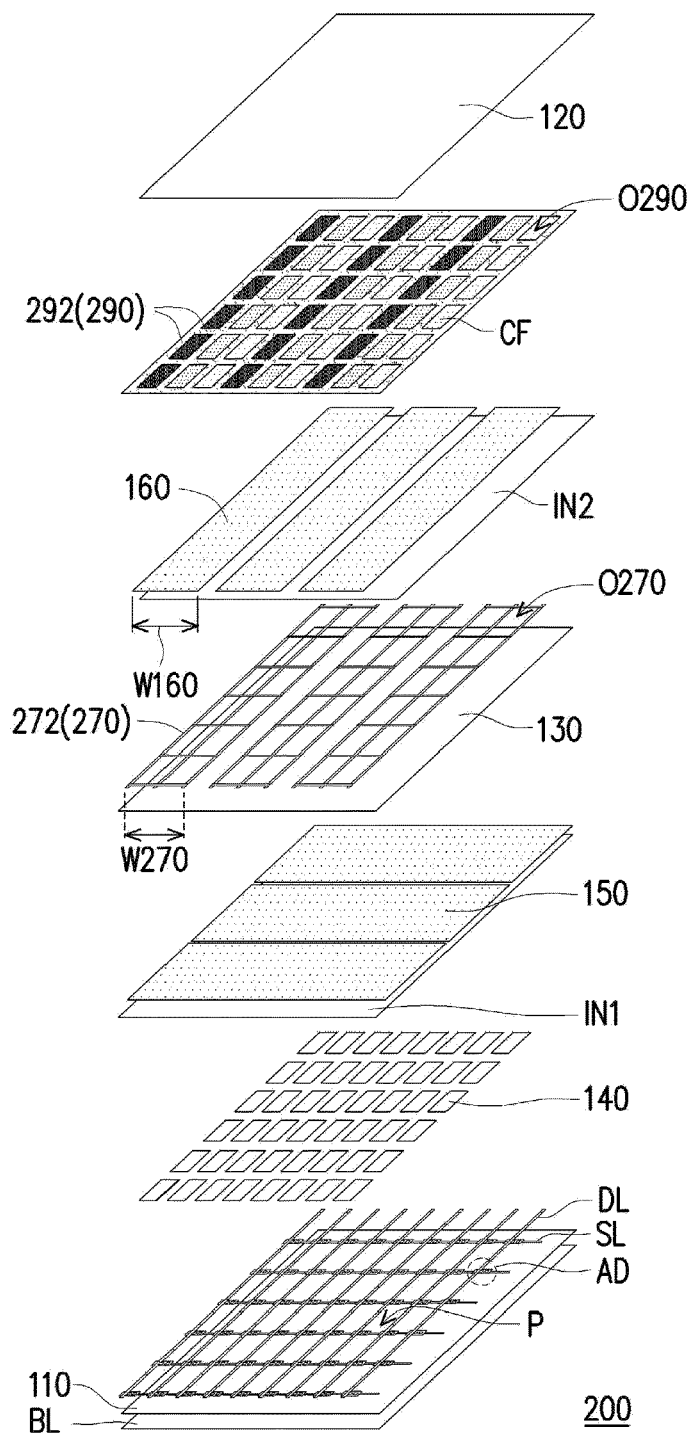
FIG. 2A is an exploded view schematically illustrating the touch display device in accordance with a second exemplary embodiment of the claimed invention.

Referring to FIG. 2A to FIG. 4, the various touch display devices in accordance with other embodiments of the claimed invention are shown, wherein the same elements as or similar elements to the above-mentioned elements may be indicated with same or similar reference numerals and/or symbols and would not be described redundantly. FIG. 2A is an exploded view schematically illustrating the touch display device in accordance with a second exemplary embodiment of the claimed invention. Although the elements shown in FIG. 2A are illustrated in a stacked manner with each being a plane, each of the elements actually has a specific thickness. FIG. 2B is a top view schematically illustrating force-sensing electrode, pixel electrode, and black matrix of the FIG. 2A.

Figure 2B:
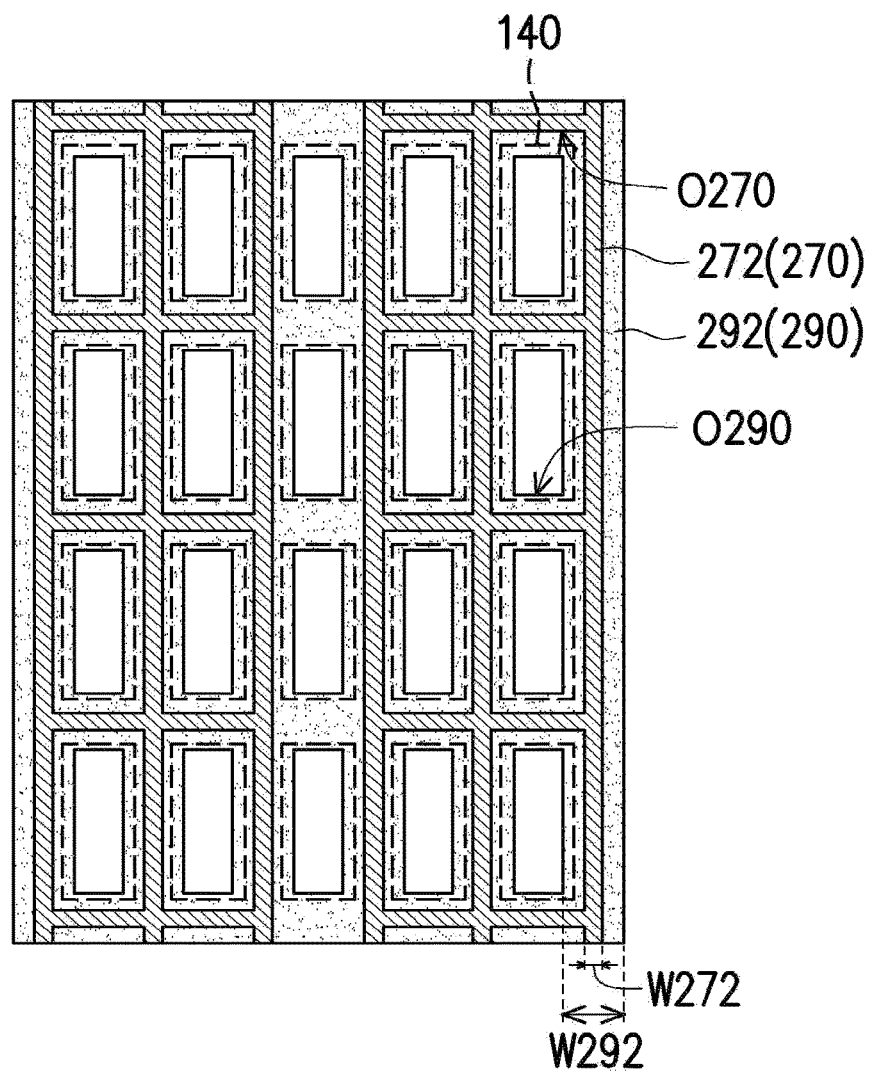
FIG. 2B is a top view schematically illustrating force-sensing electrode, pixel electrode, and black matrix of the FIG. 2A.

Referring to FIGS. 2A and 2B, the touch display device 200 may further include a plurality of scanning lines SL, a plurality of data lines DL, a plurality of active elements AD, and a black matrix layer 290. The scanning lines SL, the data lines DL, and the active elements AD are disposed on the first substrate 110, and the scanning lines SL and the data lines DL are electrically isolated with each other and disposed in a staggered manner to form a plurality of sub-pixel regions P. The pixel electrodes 140 are respectively disposed in the sub-pixel regions P. Each of the active elements AD is switched on or off via control of one of the scanning lines SL. When the active elements AS are switched on, the pixel electrodes 140 may be supplied with display driving waveforms via one of the data lines DL.

The black matrix layer 290 is disposed between the touch-sensing electrodes 160 and the second substrate 120 to shield those elements that are required to be concealed inside the touch display device 200 and to simultaneously increase the contrast of the touch display device 200. The black matrix layer 290 may include a plurality of shutter strips 292. The shutter strips 292 may be disposed in correspondence with the position of the scanning lines SL and the data lines DL and may be intersected to form a plurality of openings O290. Each of the openings O290 exposes partial region of each of the pixel electrodes 140 and each of the openings O290 is suited to accommodate color filter pattern CF for color filtering.

In one embodiment, the force-sensing electrodes 270 may be composed of metal mesh electrodes. Specifically, the force-sensing electrodes 270 may be composed of a plurality of metal bars 272 with each metal bar 272 having a width W272 less than the width W292 of the shutter strips 292 and being wholly positioned under the shutter strip 292. In this way, the black matrix layer 290 covers the force-sensing electrodes 270 and shields the metal bars 272 such that the touch display device 200 has touch-sensing and force-sensing functions without incurring visual issues.

The metal bars 272 are disposed in a cross manner to form a plurality of openings O270. Each of the openings O270 exposes one of the pixel electrodes 140. The size and amount of the openings O270 of each of the force-sensing electrodes 270, and the wiring layout, the wiring width, and the wiring density of the force-sensing electrodes 270 may be adjusted according to resolution and capacitance requirement for force-sensing. In addition, the width W270 of each of the force-sensing electrodes 270 is not larger than the width W160 of each of the touch-sensing electrodes 160 so as to avoid that the force-sensing electrodes 270 shield the electric field of the touch-sensing electrodes 160. In this way, the touch display device 200 is allowed to implement the touch detection by using the fringe field effect.

Figure 3B:
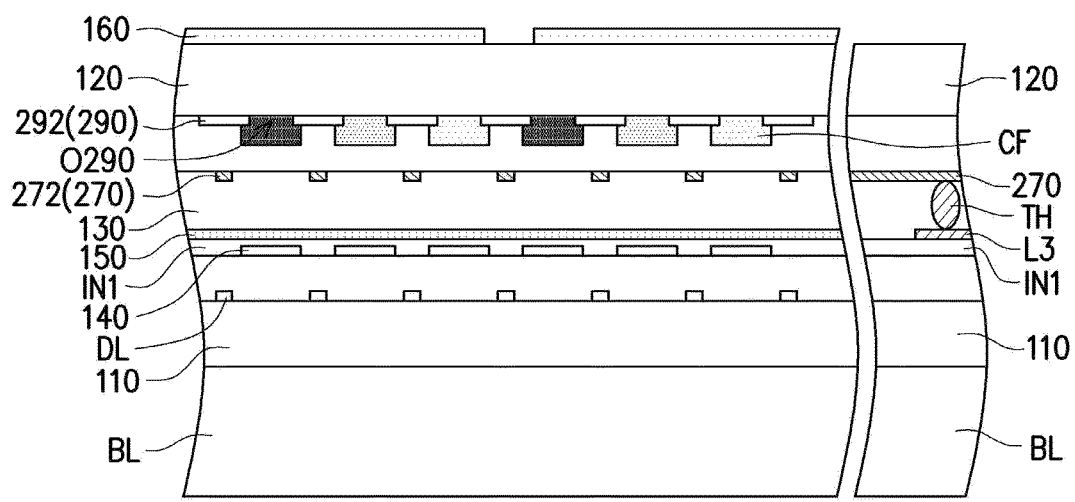
FIG. 3B is a cross-sectional view schematically illustrating the touch display device in accordance with the third exemplary embodiment of the claimed invention.

FIG. 3A is an exploded view schematically illustrating the touch display device in accordance with a third exemplary embodiment of the claimed invention. Although the elements shown in FIG. 3A are illustrated in a stacked manner with each being a plane, each of the elements actually has a specific thickness. FIG. 3B is a cross-sectional view schematically illustrating the touch display device in accordance with the third exemplary embodiment of the claimed invention. In this embodiment, the touch display device 300 of FIG. 3 is similar to the touch display device 200, and the touch-sensing electrodes 160 and the force-sensing electrodes 270 are disposed on two opposite surfaces of the second substrate 120 to save the insulating layer IN2.

Figure 4:
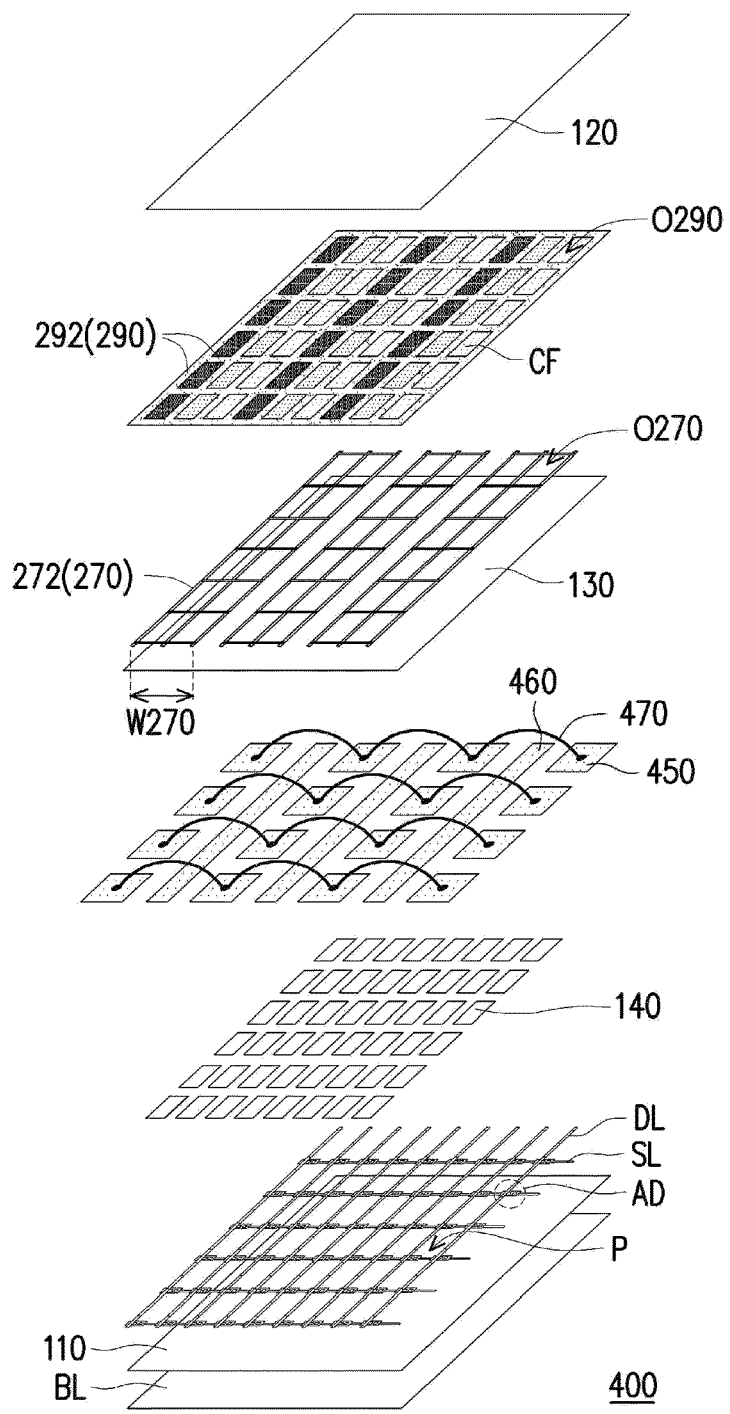
FIG. 4 is an exploded view schematically illustrating the touch display device in accordance with a fourth exemplary embodiment of the claimed invention.

FIG. 4 is an exploded view schematically illustrating the touch display device in accordance with a fourth exemplary embodiment of the claimed invention. Although the elements shown in FIG. 4 are illustrated in a stacked manner with each being a plane, each of the elements actually has a specific thickness. In this embodiment, the touch display device 400 is similar to the touch display device 200, and the touch-sensing electrodes 460 are disposed on the first substrate 110 and on the same layer disposed with the driving electrodes 450. With this structure, the touch display device 400 implements the display mode by supplying the pixel electrodes 140 with display driving waveforms and supplying the driving electrodes 450 and the touch-sensing electrodes 460 with a common voltage. In other words, the driving electrodes 450 and the touch-sensing electrodes 460 are together served as common electrodes for display. Additionally, in the display mode, the force-sensing electrodes 270 may be supplied with a fixed voltage to avoid that the force-sensing electrodes 270 influence the electric field for driving the display medium layer 130. The fixed voltage may include a common voltage or a ground signal.

The touch display device 400 may further include a plurality of connection lines 470. The connection lines 470 are disposed on the first substrate 110 and electronically insulated from the touch-sensing electrodes 460. In addition, each of the connection lines 470 connects two adjacent driving electrodes 450 in series along the direction in which the touch-sensing electrodes 460 are disposed. There may be insulating layers (not shown) interposed between the connection lines 470 and the driving electrodes 450 (and the touch-sensing electrodes 460), and the insulating layer may be formed with a plurality of openings through which the connection lines connect the corresponding driving electrode 450. In this way, the mutual-capacitance type sensing method is used in the touch display device 400 to implement touch-sensing function such as sensing touch positions.

Furthermore, the vertical projections of the force-sensing electrodes 270 and the driving electrodes 450 on the first substrate 110 are overlapped with each other. In this way, the touch display device 400 implements force-sensing function with the capacitance-sensing method. It is to be noted that the abovementioned display mode, the touch-sensing mode, and the force-sensing mode may be applied to this embodiment. For an example, in manipulation of the force-sensing mode, the driving electrodes 450 may be supplied with driving waveforms and read the force-sensing signals from the force-sensing electrodes 270. Thereby, the magnitude of the applied force can be calculated.

In sum, the driving electrodes disposed on the first substrate are served as driving electrodes in touch-sensing mode and force-sensing mode, and the touch-sensing electrodes and the force-sensing electrodes are disposed to implement mutual-capacitance touch-sensing and mutual-capacitance force-sensing according to the touch display devices in various embodiments. Therefore, the touch display devices in various embodiments not only sense the touch positions but also the force-touch so as to implement various operations of touch-sensing. In addition, disposing at least part of the sensing electrodes including the touch-sensing electrodes and/or the force-sensing electrodes inside the touch display devices not only raises the reliability of the entire device but also effectively reduces the thickness and manufacturing cost of the touch display device. In one embodiment, utilizing the touch-sensing electrodes to cover the force-sensing electrodes avoids the situation that the electric field of the touch-sensing electrodes may be shielded by the force-sensing electrodes disposed between the touch-sensing electrodes and the driving electrodes, and thereby the touch display device is allowed to simultaneously or separately implement touch-sensing and force-sensing. It is understood that the touch display device described above may be driven by self-capacitance sensing method. Specifically, the driving signals are applied to the driving electrodes and the touch and/or force sensing signal are read from the driving electrodes.

Having described at least one of the embodiments of the claimed invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents. Specifically, one or more limitations recited throughout the specification can be combined in any level of details to the extent they are described to accomplish the touch display devices.

What is claimed is:

1. A touch display device, comprising:
   a first substrate on which a plurality of pixel electrodes are disposed;
   a plurality of driving electrodes disposed on the first substrate and superimposed on the pixel electrodes;
   a second substrate arranged to opposite face the first substrate with a plurality of force-sensing electrodes being disposed on the second substrate to face the driving electrodes;
   a display medium layer disposed between the first substrate and the second substrate; and
   a plurality of touch-sensing electrodes disposed on the second substrate and arranged in a direction parallel to a direction in which the force-sensing electrodes are arranged;
   wherein the driving electrodes are supplied with a common voltage to drive the display medium layer in a display mode, supplied with touch driving waveforms for detection of touch-sensing signals produced from the touch-sensing electrodes in a touch-sensing mode, and supplied with the touch driving waveforms for detection of force-sensing signals produced from the force-sensing electrodes in a force-sensing mode, and an interval across the display medium layer between the force-sensing electrodes and the driving electrodes is variable, and the force-sensing electrodes are disposed between the touch-sensing electrodes and the driving electrodes and each of the force-sensing electrodes is covered by one of the touch-sensing electrodes.

2. The touch display device of claim 1, wherein width of each of the force-sensing electrodes is smaller than width of each of the touch-sensing electrodes.

3. The touch display device of claim 1, wherein each of the driving electrodes overlaps the pixel electrodes.

4. The touch display device of claim 1, wherein the force-sensing electrodes are metal mesh electrodes.

5. The touch display device of claim 1, further comprising:
   a black matrix layer disposed between the touch-sensing electrodes and the second substrate, wherein the black matrix include a plurality of shutter strips to cover the force-sensing electrodes.

6. A driving method of touch display device, comprising:
   providing a touch display device including a first substrate, a second substrate, a display medium layer, a plurality of pixel electrodes, a plurality of driving electrodes, a plurality of touch-sensing electrodes, and a plurality of force-sensing electrodes; wherein the second substrate opposite faces the first substrate, the display medium layer is disposed between the first substrate and the second substrate, the pixel electrodes are disposed on the first substrate, the driving electrodes are disposed on the first substrate and superimposed on the pixel electrodes, the touch-sensing electrodes are disposed on the second substrate, the force-sensing electrodes are disposed on the second substrate and between the touch-sensing electrodes and the driving electrodes to face the driving electrodes and arranged in a direction parallel to a direction in which the touch-sensing electrodes are arranged, the driving electrodes are used to drive the display medium layer in a display mode, and for detection of signals produced from the touch-sensing electrodes in a touch-sensing mode, and for detection of signals produced from the force-sensing electrodes in a force-sensing mode, an interval across the display medium layer between the force-sensing electrodes and the driving electrodes is variable and each of the force-sensing electrodes is covered by one of the touch-sensing electrodes; and
   implementing one of the display mode, the touch-sensing mode, and the force-sensing mode in a screen frame time period.

7. The driving method of claim 6, wherein the display mode, the touch-sensing mode, and the force-sensing mode are implemented separately.

8. The driving method of claim 6, wherein the touch-sensing mode and the force-sensing mode are implemented separately in the screen frame time period.

9. The driving method of claim 6, wherein the touch-sensing mode and the force-sensing mode are implemented simultaneously in the screen frame time period.

10. The driving method of claim 9, wherein the method of implementing simultaneously the touch-sensing mode and the force-sensing mode in the screen frame time period includes:
    floating the pixel electrodes;
    supplying a touch driving waveform to the driving electrodes;

reading a force-sensing signal from each of the force-sensing electrodes; and reading a touch-sensing signal from each of the touch-sensing electrodes.

11. The driving method of claim 6, wherein the method of implementing the display mode includes:

providing a display driving waveform to the pixel electrodes; and supplying a common voltage to the driving electrodes.

12. The driving method of claim 11, wherein the method of implementing the display mode further includes:

supplying a fixed voltage to the force-sensing electrodes.

13. The driving method of claim 6, wherein the method of implementing the touch-sensing mode includes:

floating the pixel electrodes;

supplying a touch driving waveform to the driving electrodes;

supplying a fixed voltage to the force-sensing electrodes or floating the force-sensing electrodes; and reading a touch-sensing signal from each of the touch-sensing electrodes.

14. The driving method of claim 6, wherein the method of implementing the force-sensing mode includes:

floating the pixel electrodes;

supplying a touch driving waveform to the driving electrodes;

supplying a fixed voltage to the touch-sensing electrodes or floating the touch-sensing electrodes; and reading a force-sensing signal from each of the force-sensing electrodes.

15. The driving method of claim 6, wherein the method of implementing the display mode includes:

providing a display driving waveform to the pixel electrodes; and supplying a common voltage to the driving electrodes and the touch-sensing electrodes.

* * * * *